United States Patent [19]

Yamamoto et al.

[11] Patent Number: 4,496,866
[45] Date of Patent: Jan. 29, 1985

[54] SUBMERSIBLE ELECTRIC MOTOR AND METHOD OF MANUFACTURING THE SAME

[75] Inventors: Sakuei Yamamoto; Mitsuhiro Nishida; Noboru Tashiro; Nobuo Sonoda, all of Fukuoka, Japan

[73] Assignee: Mitsubishi Denki Kabushiki Kaisha, Japan

[21] Appl. No.: 339,208

[22] Filed: Jan. 13, 1982

[30] Foreign Application Priority Data

| Jan. 17, 1981 | [JP] | Japan | 56-6612 |
| Jan. 17, 1981 | [JP] | Japan | 56-6614 |
| Jan. 17, 1981 | [JP] | Japan | 56-6618 |
| Jan. 17, 1981 | [JP] | Japan | 56-6619 |
| Jan. 17, 1981 | [JP] | Japan | 56-6620 |
| Jan. 17, 1981 | [JP] | Japan | 56-6621 |
| Jan. 17, 1981 | [JP] | Japan | 56-6622 |
| Jan. 17, 1981 | [JP] | Japan | 56-6623 |
| Jan. 17, 1981 | [JP] | Japan | 56-6624 |

[51] Int. Cl.³ .................................. H02K 5/12
[52] U.S. Cl. .......................... 310/87; 310/43; 310/45; 310/86; 310/89; 310/90
[58] Field of Search ............ 310/87, 43, 45, 71, 310/86, 89, 90, 42, 85, 88

[56] References Cited

U.S. PATENT DOCUMENTS

| 2,463,936 | 3/1949 | Allison | 310/87 |
| 2,698,911 | 1/1955 | Schaefer | 310/87 |
| 2,761,985 | 9/1956 | Schaefer | 310/87 |
| 2,829,288 | 4/1958 | Schaefer | 310/87 |
| 2,938,131 | 5/1960 | Maynard | 310/87 |
| 2,944,297 | 7/1960 | Maynard | 310/87 |
| 3,270,224 | 8/1966 | Turk | 310/86 |
| 3,283,187 | 11/1966 | Schaefer | 310/87 |
| 3,873,861 | 3/1975 | Halm | 310/87 |
| 4,437,027 | 3/1984 | Yamamoto | 310/71 |

Primary Examiner—R. Skudy
Attorney, Agent, or Firm—Sughrue, Mion, Zinn, Macpeak and Seas

[57] ABSTRACT

The stator core having stator coils thereon of a submersible electric motor is provided with a cylindrical can disposed in engagement with the inner surface of the stator coil and molded resin member is formed completely about the external surface of the core, the end surfaces of the core and the end portions of the coils in engagement with the end portions of the can to completely encapsulate the core and coils. The end portions of the can may be bent outwardly and embedded directly in the molded resin member during the molding thereof with the can located within the core. Alternatively, a mold tool may be located within the core for molding the molded resin member about the stator core and coils and upon removal of the tool a hollow cylindrical can may be located within the core. The end portions of the can are then sealed to the end portions of the molded member. A terminal plate and fastener fittings may also be molded integrally into the molded member. End brackets may then be secured to opposite ends of the molded resin member. The brackets are provided with bosses which extend into the can and a seal is provided between the can and the boss. The can, in conjunction with the end brackets, define a central portion for receiving a lubricant for the bearings supporting a rotor within the can.

6 Claims, 4 Drawing Figures

SUBMERSIBLE ELECTRIC MOTOR AND METHOD OF MANUFACTURING THE SAME

BACKGROUND OF THE INVENTION

The present invention is directed to an electric motor which is adapted to be operated underwater and which is hereinafter referred to as a submersible electric motor. The present invention also relates to the method of manufacturing the submersible electric motor.

The canned-type submersible electric motor as shown in FIG. 1 is well-known in the art. The motor is comprised of a stator 1 having a stator core 2 and stator coils 5 and a rotor 9 having a rotor shaft 10 and a rotor core 11. The outer wall of the stator 1 is enclosed by a stainless steel tubular housing 101 and the inner wall of the stator 1 is covered by a thin stainless steel can 3. The ends of the annular space between the can and the housing in which the stator is located are sealed by means of flanges 102. The flanges 102 are supported by end brackets 12 and 13 which in turn support the shaft 10 for rotation through bearings 14 and 15. The thrust bearing 16 is supported by the end flange 13 and the interior of the can 3 is filled with a suitable antifreeze fluid for lubricating the thrust bearings 16. A terminal 7 is secured in the end flange 12 for connection with a power supply cable 8.

While the canned-type submersible electric motor construction is excellent in the insulation characteristic of the stator coils, such a construction is disadvantageous inasmuch as it is cumbersome and expensive. Since the motor needs the flanges 102 for sealing the ends of the housing 101 and the can 3, the interfitting portions of the ends of the housing 101 and can 3, the flanges 102 and the brackets 12 and 13 must be machined carefully and these components must be then assembled which results in a high manufacturing cost.

SUMMARY OF THE INVENTION

Accordingly, an object of the present invention is to provide a submersible electric motor in which the abovedescribed drawbacks accompanying a conventional submersible electric motor have been eliminated. The submersible electric motor according to the present invention is comprised of a stator core having a cylindrical can covering the inner wall of the stator core with the outer wall and ends of the stator core and coils being encased in a molded resin member. The ends of the cans may be turned outwardly and embedded in the molded resin member or the outer cylindrical surface of the ends of the can may be bonded to the inner cylindrical end surfaces of the molded resin member. The ends of the resin molded member are supported by a pair of brackets which in turn rotatably support a rotor shaft having a core thereon. The electrical connector fitting and attachment members for securing the end brackets to the molded resin member are molded directly into the molded resin member.

A further object of the present invention is to provide a new and improved method of manufacturing a submersible electric motor. A molding tool may be inserted into the stator core and a molded resin member is formed about the outer surface of the core and the end portions of the stator core and coils. A hollow cylindrical can may then be inserted into the stator core and bonded thereto by any suitable means to completely encapsulate the stator. Alternatively, a hollow cylindrical can may be fitted within the stator in cooperation with a mold whereby the ends of the can may be molded integrally into a molded resin member which encapsulates the outer surface of the stator core and the end portions of the stator core and coils.

The foregoing and other objects, features and advantages of the present invention will be apparent from the following more particular description of a preferred embodiment of the invention as illustrated in the accompanying drawings.

DETAILED DESCRIPTION OF THE INVENTION

Figure 2:
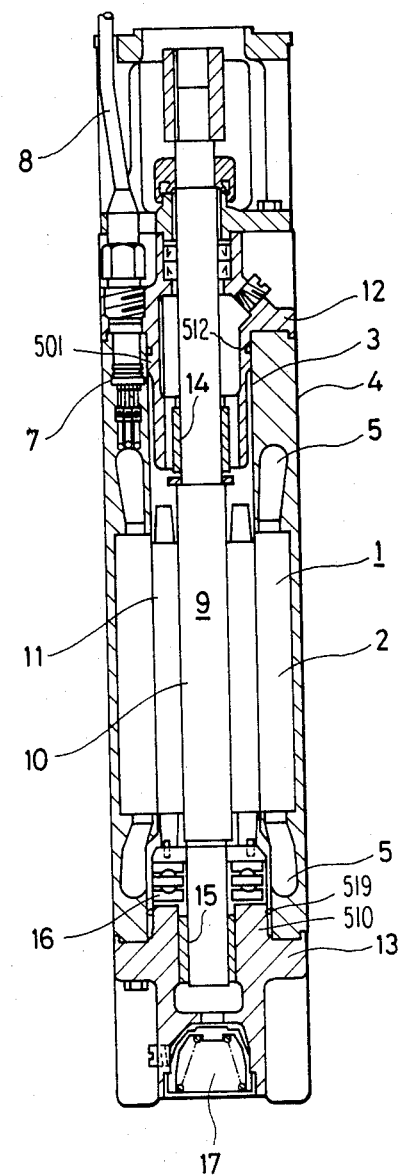
FIG. 2 is a sectional view showing a submersible electric motor according to the present invention.
Figure 4:
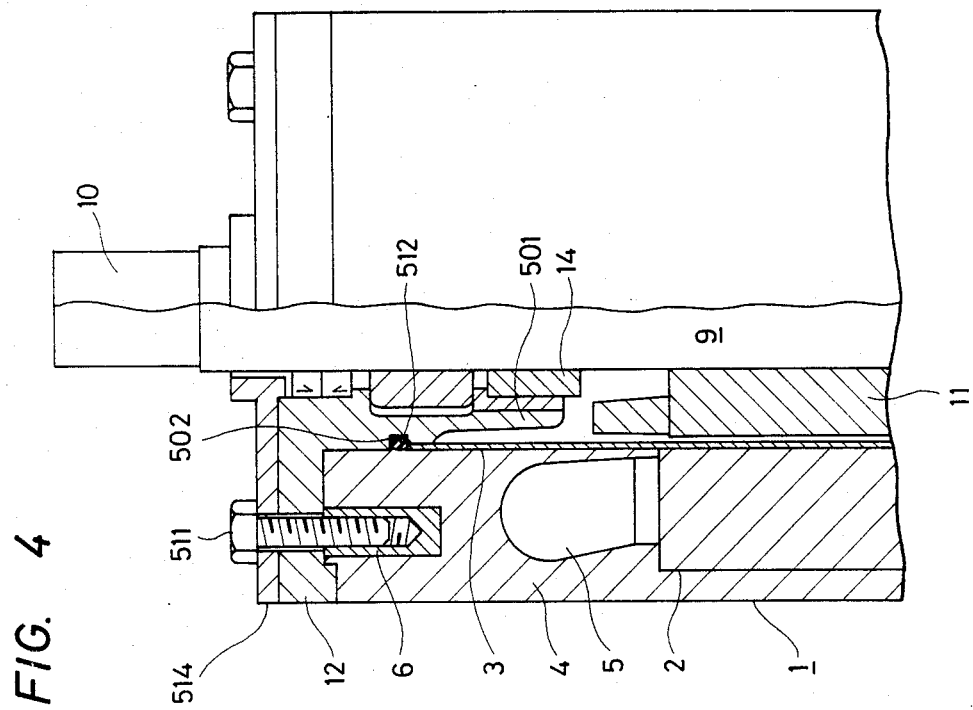
FIG. 4 is an enlarged sectional view showing the details of one end of the stator and the support bracket therefor.
Figure 3:
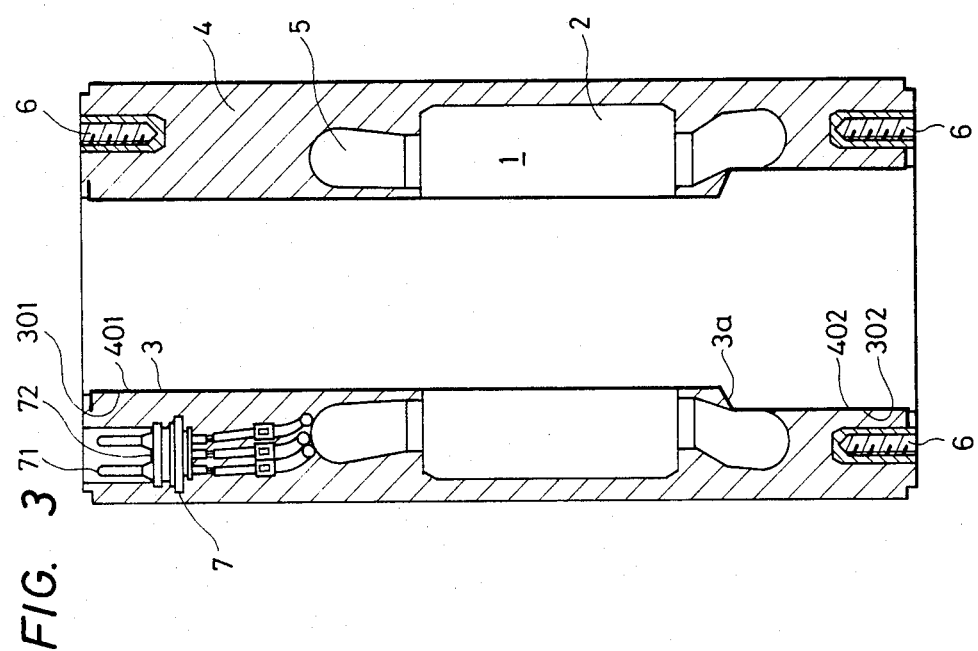
FIG. 3 is an enlarged sectional view of a stator employed in the submersible electric motor according to the present invention.

As illustrated in FIGS. 2–4 the submersible electric motor according to the present invention is comprised of a stator 1 having a stator core 2 and stator coils 5. A thin stainless steel can 3 is located within the stator in a manner described in greater detail hereinafter to cover the inner wall of the stator. The two end portions of the can 3 are bent outwardly and are encapsulated in a molded resin member 4 of polyester resin or vinyl ester resin. The molded resin member 4 is formed to surround the outer wall and two end faces of the stator core 2 and the end portions 5 of the stator coils. A plurality of metal parts 6 having threaded apertures therein are embedded in the molded resin member 4 during the molding thereof. The end portions of the molded resin member 4 are supported by brackets 12 and 13 which are secured thereto by means of bolts which are threaded into the metal parts 6. A terminal board 7, as best seen in FIG. 3, is also molded directly into the molded resin member 4 and is provided with electrical connector pins 71 to which the electric power cable 8 is detachably connected. An adhesive sealant 72 is applied to the entire surface of the terminal board to prevent the entrance of water into the stator past the terminal board. The rotor 9 which is comprised of a rotor shaft 10 having a rotor core 11 thereon is rotatably supported within the brackets 12 and 13 by means of sleeve bearings 14 and 15. A thrust bearing 16 is located in the lower portion of the can 3 which is provided with an enlarged diameter. An antifreeze liquid such as propylene glycol is located within the can 3 and an internal pressure control unit 17 is provided at the lower end of the motor.

When the ends of the can are molded or embedded directly into the molded resin member 4, the can 3 will be bonded to the stator by the adhesive force of the resin. In carrying out this method, the can is inserted into the stator core and the end portion of the can 3 adjacent the lower end thereof is expanded so as to define a shoulder 3a between the expanded portion of the can and the main portion of the can. The stator 1 is set upright and a metal mold which surrounds the stator is provided with a portion which extends up into the expanded portion to support the can and stator in the mold. The resin is then poured into the mold to encapsulate the outer surface of the core 2, the end portions of the core 2 and the end portions of the stator coils 5. The metal fastening members 6 and the terminal 7 are also embedded into the resin at this time.

The molded resin member 4 may be formed independently of the can 3 and the can 3 may then be subsequently inserted into the molded resin member 4 and the stator 1. The spaces between the two end portions 301 and 302 of the can 3 and the two end portions 401 and 402 of the inner wall of the molded resin member 4 as best seen in FIG. 3 are filled with a silicon series retaining compound resin so that the inner wall of the molded resin member 4 is sealingly bonded to the outer wall of the can 3 at both ends.

Alternatively, the can may be inserted into the stator with the two end portions 301 and 302 of the outer wall of the can 3 coated with a primer containing a reaction accelerator while the two end portions 401 and 402 of the inner wall of the molded resin member 4 are coated with an anaerobic adhesive having a polyol type acrylate as the base. The ends of the can will then be sealingly secured to the ends of the molded resin member to completely encapsulate the stator 1.

FIG. 4 shows a detailed view of one end of the electric motor wherein the bracket 12 and an end plate 514 are secured to the ends of the molded resin member 4 by means of bolts 511 which are threaded into the threaded apertures in the metal fittings 6. The bracket 12 has an integral molded resin boss 501 which extends into the can 3. The molded resin boss 501 is provided with an annular groove 502 which is flush with the end of the can 3. A resilient O-ring 512 is located within the groove 502 to seal the interface between the can 3 and the resin molded member 4. The annular groove 502 may be formed in the inner wall of the molded resin member 4 instead of in the boss 501 of the bracket 12.

The bracket 13 is also provided with a boss 510 which extends into the other end of the can 3. The rotor 9, which is comprised of a rotor shaft 10 having a rotor core 11 thereon is rotatably supported within the can 3 by means of the brackets 12 and 13 with the can 3 and the brackets 12 and 13 forming a closed chamber adapted to receive a lubricant. Sealing means 512 and 519 are interposed between the bosses 501 and 510, respectively, and the can 3 to prevent leakage of said lubricant from said chamber.

Figure 1:
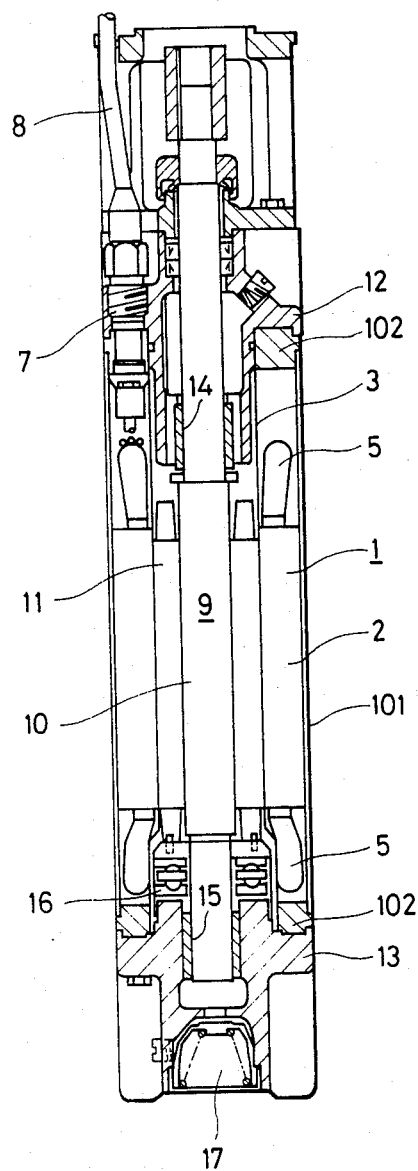
FIG. 1 is a sectional view of a conventional canned-type submersible electric motor.

By constructing the submersible electric motor according to the present invention, the stator is completely encapsulated by the can 3 and the molded resin member 4 thereby preventing the entrance of water into the stator from the exterior thereof. By using such a construction, it is unnecessary for the submersible electric motor to have the complicated and expensive arrangement shown in the prior art construction of FIG. 1. Furthermore, by constructing the can according to the method of the present invention, the electrical insulation characteristics of the coil will not be lowered by water sealed therein. When the molded resin member is formed prior to the insertion of the can, there is no danger of the can being expanded and deformed by gas generated during the molded operation. Furthermore, by locating the molding tool within the core, the firmness of this support enables the slots of the core to be filled with resin thereby improving the insulation characteristics of the stator.

By molding the terminal board directly into the molded resin member 4 during the formation of the latter, a separate terminal board mounting step can be eliminated. The embedding of the terminal board along with the coating of the entire surface of the terminal board with an adhesive sealant positively prevents the entrance of water from the outside into the stator.

When the can 3 is inserted into the core 1 subsequent to the molding of the molded resin member 4, the use of a silicon series retaining compound resin or an anaerobic adhesive between the molded member and the can will prevent the entrance of water from the outside into the stator.

In the method of the present invention where the member 4 is molded directly onto the can 3, the ends of the can will be embedded in the molded member 4 so that the can will never come off and the rotor can be readily assembled within the can. Also, the expanded portion of the can in this embodiment receives a portion of the mold so that the stator can be positively positioned during the molding process.

While the invention has been particularly shown and described with reference to preferred embodiments thereof, it will be understood by those in the art that the foregoing and other changes in form and details may be made therein without departing from the spirit and scope of the invention.

We claim:

1. A submersible electric motor comprising an annular stator core having stator coils thereon, a hollow cylindrical can fitted within said stator core to cover the inner surface thereof, a one piece molded resin member surrounding the outer wall of said stator core, both ends of said stator core and the end portions of said stator coils, a pair of end brackets secured to opposite ends of said molded resin member and having bosses extending into said can and rotor means rotatably supported within said can by means of said brackets, said can and said brackets forming a closed chamber adapted to receive a lubricant and sealing means interposed between said bosses and said can to prevent leakage of said lubricant from said chamber.

2. A submersible electric motor as set forth in claim 1, wherein said can and said molded resin member are bonded together by the adhesive force of the resin forming said molded resin member.

3. A submersible electric motor as set forth in claim 1, wherein the end portions of said can are bent outwardly and embedded in said molded resin member.

4. A submersible electric motor as set forth in claim 1, further comprising a terminal board embedded in said molded resin member for electrically connecting said stator coils to an external electric power supply and an adhesive sealant covering the entire surface of said terminal board.

5. A submersible electric motor as set forth in claim 1, wherein a silicon series retaining compound resin is located between said molded resin member and the cylindrical end portions of said can for sealing said can to said molded resin member.

6. A submersible electric motor as set forth in claim 1, further comprising an anerobic adhesive bonding both cylindrical end portions of said can to said molded resin member.

* * * * *